Dec. 29, 1964 K. M. GROETSCHEL 3,163,011

CONNECTION FOR LAGGING IRONS

Filed Nov. 14, 1960 4 Sheets-Sheet 1

INVENTOR
KARL M. GROETSCHEL

Malcolm W. Fraser

ATTORNEY

INVENTOR
KARL M. GROETSCHEL

Malcolm W. Fraser

ATTORNEY

Dec. 29, 1964

K. M. GROETSCHEL 3,163,011

CONNECTION FOR LAGGING IRONS

Filed Nov. 14, 1960

4 Sheets-Sheet 3

INVENTOR
KARL M. GROETSCHEL

Malcolm W. Fraser

ATTORNEY

Dec. 29, 1964 K. M. GROETSCHEL 3,163,011

CONNECTION FOR LAGGING IRONS

Filed Nov. 14, 1960 4 Sheets-Sheet 4

INVENTOR
KARL M. GROETSCHEL

ATTORNEY

United States Patent Office 3,163,011 Patented Dec. 29, 1964

3,163,011

CONNECTION FOR LAGGING IRONS

Karl M. Groetschel, 3–5 Shutzenbah, Bochum, Westphalia, Germany

Filed Nov. 14, 1960, Ser. No. 68,810
4 Claims. (Cl. 61—45)

This application is a continuation-in-part application of my application Serial No. 492,914, filed March 8, 1955, and now Patent No. 2,959,924.

The invention relates to lagging irons for the lagging of mines, having lock components, engaging with one another in the manner of a fork and tongue and connected with one another rotatably about a horizontal axis, the said lagging irons being adapted to be locked with respect to one another in any angular position within the range required, by means of a transversely slidable element. Such lagging irons are firstly advanced cantilever-fashion, as members of an assembly, then they are supported by props in accordance with the advance of mining, and eventually removed again on the side of the gobbing.

The invention has the object of developing such lagging iron connections in such a manner that on the one hand the use of lagging irons provided therewith is possible in one position as well as in a position turned 180°, and that on the other hand in each of these two positions locking is possible at will in one direction or in the opposite direction, without requiring, as in the known designs, either two transversely shiftable locking elements or one element only, which then had to be inserted from different sides at any time. Moreover it is an object of the invention by suitable development of such connections to provide the possibility of restoring the freedom of articulation of the connection in a controllable manner advantageous to the saving of the lagging irons and particularly the lock members of the roof.

This is attained according to the invention substantially by a novel design of the locking element which is formed by a transverse plate shiftable in the lock of the lagging irons and formed complementary to the front end of the tongue on which it is mounted, such that this transverse plate has an oblique ridge going right through from one of its ends to the other and having two abutment faces, one of which co-operates with one of two counter-faces formed by a recess in the end of the tongue in one of the two positions of the lagging iron, and of which the other co-operates with the other one of the said counter-faces when the lagging iron is turned through 180°.

This transverse plate is provided at both its ends with abutments limiting the extent of its transverse displacement and preventing it being removed from the lock altogether.

Preferably the recess in the end of the tongue of the lock and accordingly the oblique ridge of the plate co-operating therewith are so constructed, that when one of the abutment faces contacts a counter-face of the tongue, such a play is present between the other opposite abutment face of the ridge and its associated counter-face in the tongue, that the plate can be shifted from its locking position to a considerable extent before the tongue is locked in the opposite direction by the second face of the plate which comes into contact with its associated counter-faces in the tongue.

After the lagging iron, which had firstly been advanced cantilever-fashion, has been supported by a prop, the possibility is thereby established of restoring the freedom of articulation of the connection by an appropriate displacement of the plate for the purpose of abolishing its rigidity to the extent required for forestalling the danger of damage to the lock components in the case of excessive loading, as well as conversely restoring rigidity if necessary in the opposite direction upon changing action of pressure.

The abutment faces of the oblique locking ridge have to be adapted to the counter-faces at the end of the tongue, which are likewise arranged obliquely and run in the longitudinal direction of the lagging irons, being however preferably designed straight, in such a manner that if possible in every attachment position of the lagging irons, whether stretched out or angularly deflected, the largest possible area of contact between the engagement points is established. This involves a certain twisting of the operative faces of the locking ridge.

According to another embodiment the mutually corresponding faces of the locking ridge, and of the tongue, could be so profiled that the engaging components mesh with one another in the approximate manner of an involute, cycloid or similar toothing. Thereby, however, no large area contact is attained, but yet an excellent line contact of the engaging components, which is quite sufficient when using materials of appropriate quality, since in all vertical angular positions of the lagging irons this line contact remains constant.

In a further development of the invention, when the bilaterally symmetrical formation of the lock elements is dispensed with, one of the two contact faces of the end of the tongue and/or of the locking ridge can be arranged at a larger distance from the axis of the lagging iron than the other. Thereby it is made possible to keep the aforesaid play between the locking elements particularly large, if desired, which play is required for restoring the mobility of articulation of the connection after the lagging iron has been supported by a prop, without curtailing the extent of possible angular deflection in one of the turned positions of the lagging iron, so that the operational characteristics of the lagging iron in this position are kept fully preserved, and are somewhat reduced merely in the opposite turned position.

It may be found particularly advantageous to dimension the play between one of the front edges or faces of the end of the tongue or of such a locking ring or of the bolt, respectively so small, that the lagging iron which, when being fitted, is pushed with its tongue firstly from a downwardly inclined position over the locking ridge and which is thereby resting on the latter and adapted to be tilted up, abuts onto the locking ridge or onto the plate itself in such a manner, that in the case of connection of the two irons by means of a joint pin the direction of the butt joint in the two lock elements results in predetermined position of the lagging iron to be advanced, preferably in a position somewhat below the stretched out position. This allows a labour-saving engaging, in a fraction of a second, of the lagging iron by means of the joint pin, whereupon the operator is immediately relieved from the weight of the lagging iron and is safeguarded, since the connection is already locked by the resting in of the tongue into the locking ridge which likewise takes place automatically when putting on the lagging iron. The operator can then if necessary stop, before he corrects the advanced position of the lagging iron by further pushing or driving of the plate into the lock.

In order that the lagging iron may be advanced in a labour-saving manner, even in mine workings in which, because of a larger height of the coal face bay or of too great a weight of the lagging iron, a mere resting of the tongue of the lagging iron on the oblique ridge of the bolt for the purpose of tilting up the lagging iron is no longer possible or not advisable, the lagging iron lock designed in the manner described can be provided with simple means which allow it to be tilted up after having been temporarily suspended cantilever-fashion.

As auxiliary means of this kind there may be provided in a known manner, for example, on the tongue, a special recess, such as a push-tongue bore or the like, preferably however a notch formed by a hook-shaped member, which according to a particular feature of the invention, co-operates with a device arranged on the fork, for example a push-through pin, in such a manner that during the tilting up of the lagging iron about the pin as the pivot axis, the tongue is made to rest in forcibly with the locking ridge, so that by a mere pushing in of the joint pin into the lock at the moment when the bolt holes register, the cantilever connection of the lagging iron can be established in a position which corresponds largely to the final advanced position.

The bores provided in the prongs of the fork for taking in the push-through pin have a comparatively small diameter in view of the weakening of the fork that would otherwise occur, for instance the push-through pin is not made very strong so that it could be bent or shorn off by lever action which takes, place when inadvertently the lagging iron is tilted up beyond the position in which the bolt holes register with one another and causing the tongue to hit the bolt too hard.

In order to prevent this, according to a further feature of the invention a device is arranged on the lock which indicates the exact coupling position of the two lagging irons with respect to one another in any one of the two turned positions and/or secures the same by an abutment, for example in the form of markings provided on the tongue and on the fork which correspond with one another in the accurate coupling position of the lagging irons, preferably in the form of abutments, resting in means or the like. According to a special form of construction these abutments may be formed on the one hand by a loose locking member adapted to be arranged on the tongue, preferably a further push through pin, and on the other hand a projection or the like arranged on the prongs of the fork, on which this locking member abuts when the coupling position is reached.

According to a further embodiment the indicator and/or safety device may alternatively be formed by a resting-in means in the form of a spring bolt or the like, capable of being put out of action, arranged at one part of the lock (either the fork or the tongue), and of a rest corresponding to this means arranged on the other part.

All the auxiliary means that have been proposed for facilitating the fitting in of the lagging irons are to be provided in a double or double-acting arrangement in such a manner that they can serve their purpose in both turned positions of the lagging iron.

According to a further embodiment, the transverse plate may, instead of the obliquely directed locking ridge running right through, have alternatively two locking ridges running parallel to one another and equally profiled, in which case then in an inverse arrangement so that it is not the outward faces, but the inner faces, but the inner faces of these two ridges which form the active faces, and co-operate with a projection at the end of the tongue rather than with a recess of appropriate shape.

The basic principle of operation of this modified embodiment is inherently the same as that of the one described first. Although it is not as advantageous in every respect, particularly in respect of the operating of the lagging iron, it has on the other hand the advantage that the effective face runing obliquely in the direction transverse of the lagging iron in accordance with the obliqueness of the ridges of the plate can be arranged more easily on the projection of the tongue than those of the recess of the tongue.

In order to be able to vary the possibilities of angular deflection and other properties of the lock, preferably on the site itself, and thus to adapt the connection in every particular case to the conditions prevailing, according to a further feature of the invention several mutually interchangeable transverse plates can be used at will, each of which has for example a different length or is provided with a differently profiled locking ridge or double ridge or has a different design adapted in another respect to the varied conditions, and at the same time optionally on the tongue, a correspondingly interchangeable piece may be provided arranged on the tongue an adaptation of the profile of the recess or of the projection on the end of the tongue is required to such a modified shape of the locking ridge of the bolt actually inserted.

According to a particular feature of the invention the transverse plate can be so constructed that their locking ridge is interrupted in its middle range to a distance which permits the passage of the end of the tongue, the two parts of the ridge being then preferably somewhat offset with respect to one another. Such a transverse plate permits at its middle position the free tilting of the advanced lagging iron and particularly the establishing of a perfect freedom of articulation of the connection after the advanced lagging iron has been supported by a prop, and moreover permits the lagging iron to be tilted downwardly about the pin on the last iron not yet dismantled on the gobbing side.

With basically the same effect the exchangeable plate may alternatively have a pair of ridges consisting of two part-pairs, between the inner ends of which a gap is provided which permits the passage of the tongue.

It has been found convenient in the construction of a lagging iron connection as described hereinbefore to design the locking element, that is the plate, and/or the coupling element—the pin—in such a manner that the connection is made thereby yielding to a certain extent in case of overloading.

This—in connection with the advantage of saving material and accordingly weight—is attained according to a further feature of the invention in that the locking and/or coupling element while retaining its functionally required basic dimensions is at least partly provided with a recess or the like into which the material of the work piece stressed at the abutment faces escapes when exceeding a certain overload. This principle can be realised, for example, in the coupling pin in that the same is made hollow and has a longitudinal slot. In the same sense the oblique ridges can be made hollow at least partly so that a corresponding groove is formed at the back of the plate. It is particularly advantageous when the pin or plate designed as described hereinbefore is made of spring steel or of a material having properties corresponding to those of spring steel.

It is particularly advantageous from the point of view of the possibility of readily dismantling the lagging iron on the gobbing side, when the wedge surfaces are offset with respect to each other, in such a manner that in continuation of the upper end of the wedge face actually on top as well as in continuation of the lower end of the wedge face actually on the bottom, a gap is formed which opens upwardly and downwardly, respectively, which permits the passage of the tongue, while on the other side the wedge surfaces extend right to the end of the plate.

This embodiment involves a shorter length and reduced bulkiness of the locking element, which is particularly advantageous in the case of a small lateral distance of the laggings. Moreover it makes it possible to bring the plate out of its engagement with the tongue even without previous loosening of the connecting pin, so that the lagging iron to be dismantled can swing downwardly pendulum-fashion, before being eventually dismantled.

In cases in which the individual rows of laggings have to be set at small distances from one another, it may be of advantage to make the bolts curved in the direction towards the coal face. Plates curved in this manner are more easily operated in confined spaces than the straight plates, and offer in certain circumstances some advantages from the point of view of the desirable abutting of the effective faces of the engaging components as closely as possible.

In order to allow the inetrchange of the plates on the site, the means securing the locking plate on the lock against being completely detached are so constructed that it can be put out of action without having to damage or to remove the same.

For this purpose the safety device may for example consist of an adjustable member co-operating with two abutments provided on the plate preferably through intermediate pieces, which member is accessible through a bore provided on the plate or the like to an operating tool, preferably to a special tool. The last arrangement has the advantage that, as may be desirable, only certain persons equipped with the special tools are capable of removing the plate from the lock.

Such a device may be constructed according to a further embodiment of the invention in such a manner that it permits, in addition to the safety task, a controllable braking of the plate, and it may for this purpose be placed under the action of a reinforced resilient intermediate piece, preferably a rubber ring or the like.

This resilient intermediate piece and its reinforcing body, consisting preferably in a pin, washer or capsule, are preferably movably connected to the safety means adjustably arranged on the root of the fork of the lock, or is movably mounted in the fork, for example by means of a threaded pin or the like engaging into a lateral slot provided thereon, and thereby secured against falling out.

In order to prevent the iron falling when dismantling, the lagging iron is assembled according to the invention after the loosening of the pivot pin and the subsequent disengagement of the mutually co-operating components, the locking ridge and tongue, preferably the two locking irons are easily detachably connected with one another by a chain, which is attached on a preferably stirrup-shaped device mounted on the fixed lagging iron, while the chain carried by it is simply hooked into holes of the lagging iron to be dismantled.

The stirrup-shaped device may serve at the same time as an abutment for a lever adapted to be inserted between the components of the lock, by means of which the lagging iron can be forced out, in case it should not detach itself automatically from the oblique face of the tongue after the loosening of the connecting pin.

In the most frequent case, in which the use of such a stirrup can be dispensed with, this lever may be provided and used per se in order to effect the forcing apart and disengaging of the lock components in principally the same manner, by engaging them directly on the lagging iron.

According to a modified embodiment of the invention, for the same purpose instead of the lever and elongated hole may be provided at the place on which otherwise the hole intended for receiving the stirrup is provided, into which elongated hole after the loosening the coupling pin a transverse wedge is driven, which forces the lagging iron to be moved away and loosens the same from its engagement with the subsequent lagging iron.

According to a further feature of the invention, which is not dependent on the special construction of the lock connecting a lagging iron to be forepoled with such an iron already supported by a prop, or for example with a prop, constructed in itself in the kind of a chock from which the lagging iron directed to the coal face is to be forepoled, the actuation of the locking element, i.e. the pushing in of said element for the purpose of locking and eventually its withdrawal for the purpose of loosening the locked connection is performed by mechanically respectively automatically actuated means, preferably in such a manner that by the actuation of the locking member in the pushing in direction at the same time the lagging iron to be forepoled in its cantilevered position is swung up from an initial position in which it hangs on the rearward lagging iron respectively other supporting element with which it is connected by the bolt into its working position designated by the direction of the roof, i.e. the generally horizontal respectively correspondingly tilted upward or downward position.

This actuation consists in exerting a strong pressure to the locking member in the direction in which it has to be pushed in, which direction may be according to the general construction of the lock crosswise or lengthwise with respect to the lagging iron. In the first case the locking member exerts a spreading action between one face of the locking part of the supported iron and a counter-face on the iron to be lifted respectively forepoled. In the other case of the pushing in of the locking member in the lengthwise direction, the locking member to be pushed represents a support for the lagging iron to be forepoled acting directly or over an intermediate member onto the lower face of the iron to be forepoled in the proximity of the connecting bolt.

The pressure to be exerted for this purpose to the locking member is preferably exerted by pneumatically or hydraulically actuated means, i.e. the piston or the cylinder of a fluid pressure actuating cylinder the other element of which is anchored on a fixed part of the lagging iron, already supported respectively the chock or the like from which the lagging iron has to be forepoled into its cantilevered position.

This method of actuating the iron to be forepoled which is as already pointed out principally independent on the construction of the connection between the both parts facilitates the manutentation. It is then no more necessary that a man who fits in the lagging iron finds himself at the end thereof in the proximity of the coil face out of the range of the lock.

Instead of hydraulically or pneumatically actuating means according to another possibility a mechanically actuated locking element may serve for this purpose which is provided between a stationary point and one end of the coupling and/or locking element, which element is under load, and which drives the coupling and/or locking element into the coupling and/or locking position when loosening the locking of such element.

For this purpose for example a spring bar or the like can be used, which engages with its one end on the lagging iron to be fitted, preferably on the lagging iron carrying the coupling and/or locking element, and with its loaded other end engages the coupling and/or locking coiled spring, a strongly resilient rubber body or the like can be used.

In the case of the last described embodiment of the invention the release of the elements under load is effected in that with an appropriate design of the mutually co-operating lock components the entrance passage for the transversely shiftable locking elements, previously blocked by a part of the lagging iron itself, is automatically cleared by the vertical tilting of the lagging iron to be advanced.

The additional device for pushing in respectively releasing the locking member described last may be used in a similar manner, which has merely to be adapted suitably, to the insertion of the joint bolt as well as of the locking elements, namely of any construction desired, in the case of its being used for pushing in the pivot pin, preferably a device known in itself in the form of a transverse pin adapted to be pushed through is provided on the lagging iron, on which the lagging iron to be advanced is firstly suspended in order to be swung up about the axis thereof, in such a manner that in the course of this movement the plate holes are forcibly brought into juxtaposition.

In the drawings the lagging iron connection according to the invention and its individual features are shown in their principal embodiments.

FIGURE 13 is a side elevational, partly sectional view of part of two coupled lagging irons;

FIGURE 14 shows a side elevational diagrammatic view of the device in operative position;

FIGURE 15 shows the position of the device when the locking element has been pushed in;

Figures 14, 15:
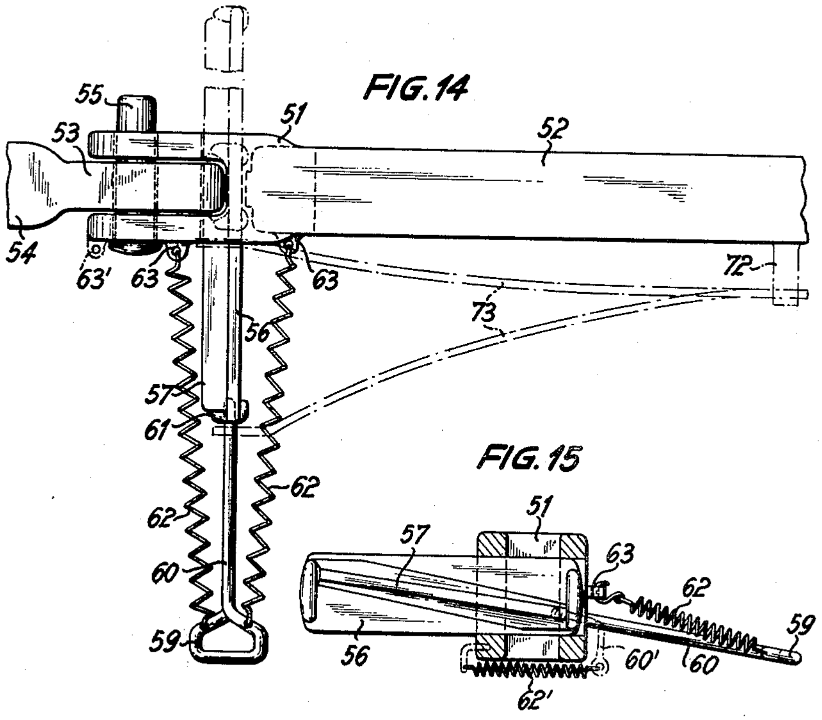
Figure 17:
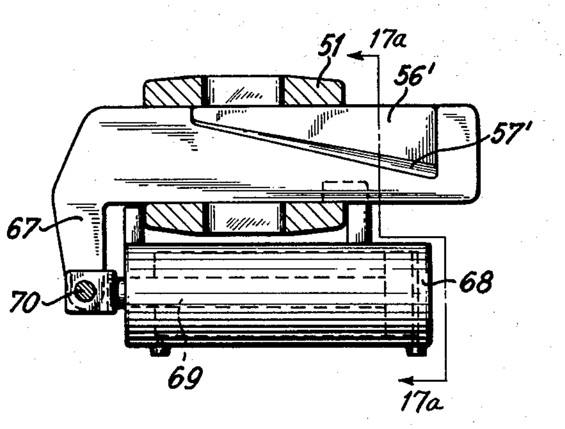
Figure 18:
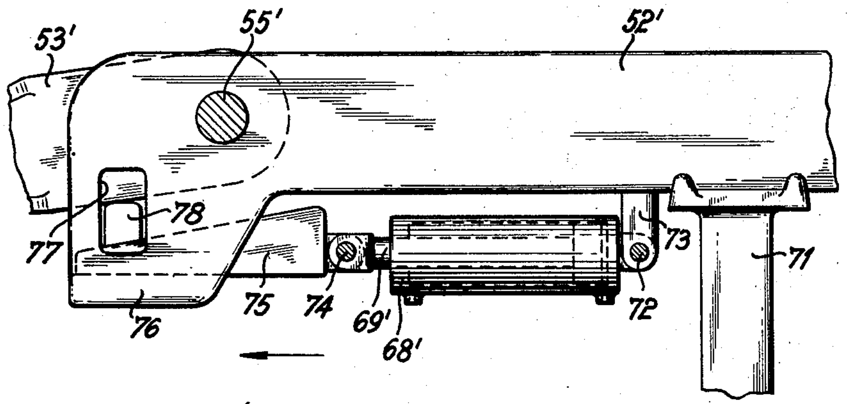
Figure 17A:
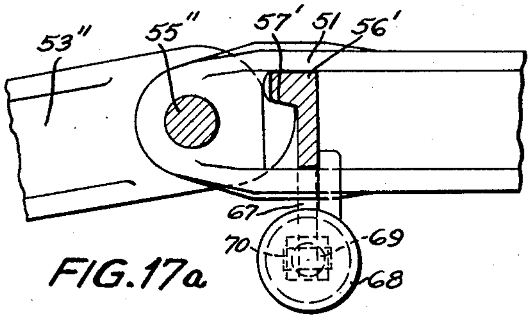

FIGURE 17 shows in a manner corresponding to FIGURE 15 in cross-section a lagging iron lock, the locking member of which is actuated by a hydraulic cylinder pushing in respectively withdrawing said member in crosswise direction with respect to the lagging iron by which it is possible, by pushing in the locking element, to exert a pressure in the direction it is being pushed effecting, sufficient to lift respectively tilt the lagging iron to be forepoled from a downwardly inclined respectively hanging position up into its final fitting position adapting to the direction of the roof;

FIGURE 17*a* is a sectional view of the device illustrated in FIGURE 17 generally taken along line 17a—17a thereof; and FIGURE 18 shows in side elevation a modification of FIGURE 17 according to which a hydraulically actuated locking member which is arranged and pushed in respectively withdrawn in the lengthwise direction of the lagging iron.

Figure 4:
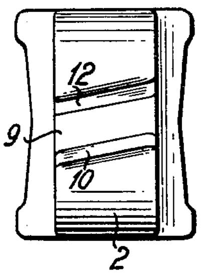
FIGURE 4 shows an end elevation of a part of FIGURES 1 and 2.

In FIGURES 1 to 4, the tongue welded to the end of the lagging iron 1 facing towards the gobbing is denoted 2, the fork welded to the lagging iron 4 is denoted 3, and the pivot pin is denoted 5, which establishes the vertically movable joint. The connection is made rigid in the downward direction as illustrated by a transverse plate 6, the locking ridge 7 of which, shown in FIGURE 3 in front elevation, engages into the recess 9 provided at the end 8 of the tongue 2, which is shown in FIGURE 4 in lateral elevation, in that the lower effective face 10 of the recess of the tongue abuts on the lower effective face 11 of the locking ridge 7, while between the effective faces 12 of the recess of the tongue on the one hand and the effective face 13 of the ridge 7 on the other a free gap is left, which affords a limited freedom of articulation to the connection in the opposite direction.

As will be clear from these figures, the effective faces of the tongue running obliquely in accordance with the oblique position of the locking ridge of the plate are plane faces, while those of the locking ridge are somewhat warped. In the FIGURES 1 and 2 the profiled hole is denoted 14 in which the plate 6 is forcibly guided while there is a free passage of the oblique locking ridge 7, in that its upper and lower edges engage into special recesses of the hole 14. In FIGURE 2 it is indicated in chain-dotted lines, how the plate 6 may alternatively be shaped curved for the purpose of easier servicing in confined spaces, which presupposes of course a corresponding guide of the plate in the lock. At the ends of the plate, flanges 15, 15' may be shaped as abutment heads for the percussion tool serving for driving in the plate. They are so designed that they do not hamper the insertion of the plate into the hole 14 or its entire detachment from the lock.

In order to secure the plate in the lock, as shown in FIGURE 2, abutmentts 16, 16' are arranged at the rear of the flanges 15, 15' on the plate. These abutments co-operate with the safety device arranged at the root of the fork, the adjustment screw 18 of which is accessible to the operating tool through the bore 17 provided in the bolt. In co-operation with the annular rubber insert 20, which is protected by a cup-shaped reinforcement 19 and which is connected to the head of the adjustment screw and is displaceable by the latter, this device allows alternatively the safety means to be put out of operation for the purpose of exchanging the plate for another one as well as a controllable braking of the bolt, which braking can also be made ineffective. The braking is of particular importance when using the lagging irons on coal faces of sloping down seams in order that any possible loosening of the plate, here obliquely positioned by any shaking of the rocks. Also when transporting the lagging irons, this braking action may be advantageous, but in other cases it may be detrimental so that the means must be provided for putting it out of operation. The possibility of controlling the braking attained by the device may be of great importance when owing to extreme smoothing of the guide of the plate, either through repeated use or through coal dust which has got in and acts as a lubricant, or owing to a larger inclination of the locking ridges, there exists the possibility of exceeding the self-locking of the plate in the lock. In order to attain if necessary a particularly strong braking action, it is convenient to arrange on the plate itself and/or on the side of the reinforcement of the rubber ring facing the same, a lining having a high frictional co-efficient.

FIGURE 5 shows the arrangement of a locking ridge and tongue with unilaterally enlarged play between the non-contacting effective faces 12' and 13' for the purpose of particularly enlarging the range of freedom of articulation of the joint, after the lagging iron has been supported by a prop. It moreover shows the profile of all four effective faces of the kind or gear toothing. From the figure moreover the construction of the coupling pin of the locking element as described hereinbefore can be seen which serves for attaining a certain yielding upon overloading by deliberately providing a weak spot. For this purpose according to the embodiment the pin 46 is made hollow and has a longitudinal slot 47. The plate, too, is made hollow as shown at 45.

Figure 1:
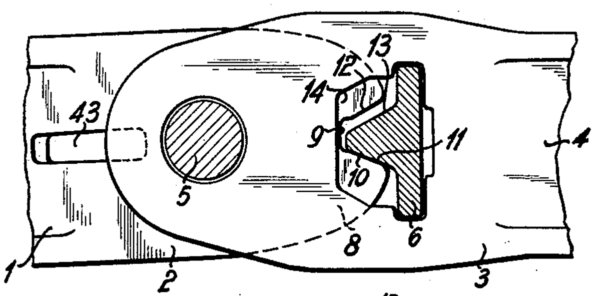
FIGURES 1 and 2 show a partly sectional lateral and plan view respectively of part of two lagging irons coupled together according to one embodiment of the invention.
Figures 2, 5:
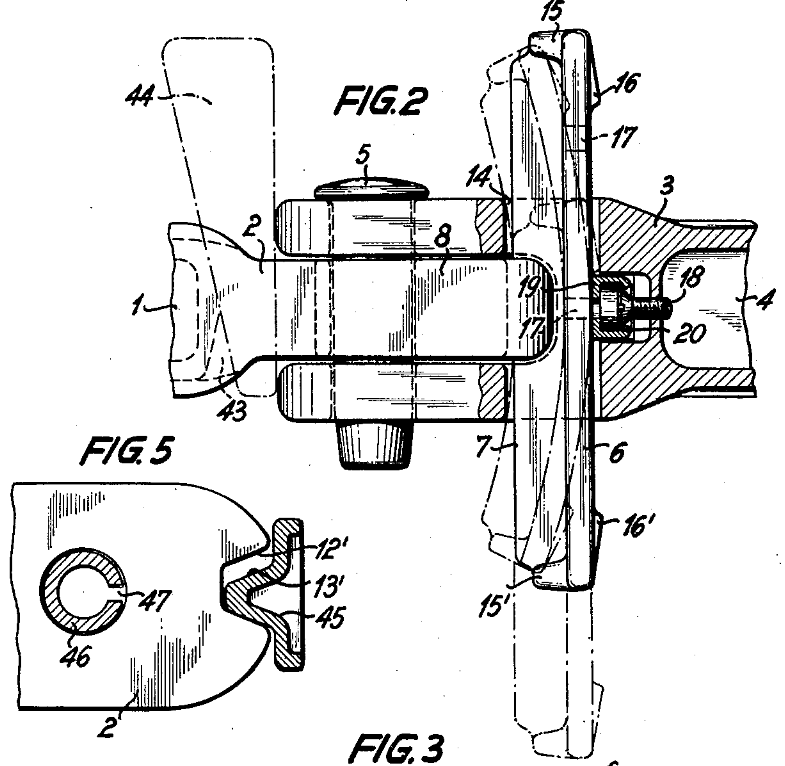
FIGURE 5 shows a modification, inside, partly sectional elevation of the embodiment of FIGURES 1 and 2.
Figure 6:
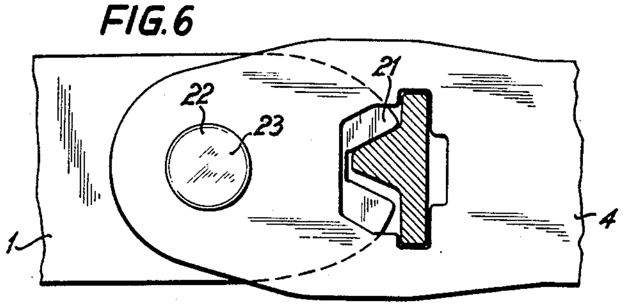
FIGURE 6 illustrates the manner of forming the coupling shown in FIGURES 1 and 2, and is a lateral, partly sectional simplified view similar to that of FIGURE 1.

FIGURE 6 illustrates the connection according to FIGURE 1 in that position of the components with respect to one another which results after the lagging iron 1 has come to rest with the upper effective surface of the recess in the tongue, firstly on the locking ridge of the lagging iron 4, and has then been tilted up on the locking ridge until the upper point of the tongue 21 abuts on the plate and thereby has been brought in the axial direction and can be forced into the position of juxtaposition of the bolt holes 22, 23. Any jamming of the engaging components owing to the butt joint is not to be feared since after the pushing in of the joint pin the play determined by the tolerances between the latter and the bolt holes relieves any such jamming. The manner of fitting determined thereby saves labour and allows an extraordinarily quick advance, is mainly applicable under favourable local conditions.

Figures 7, 8, 9:
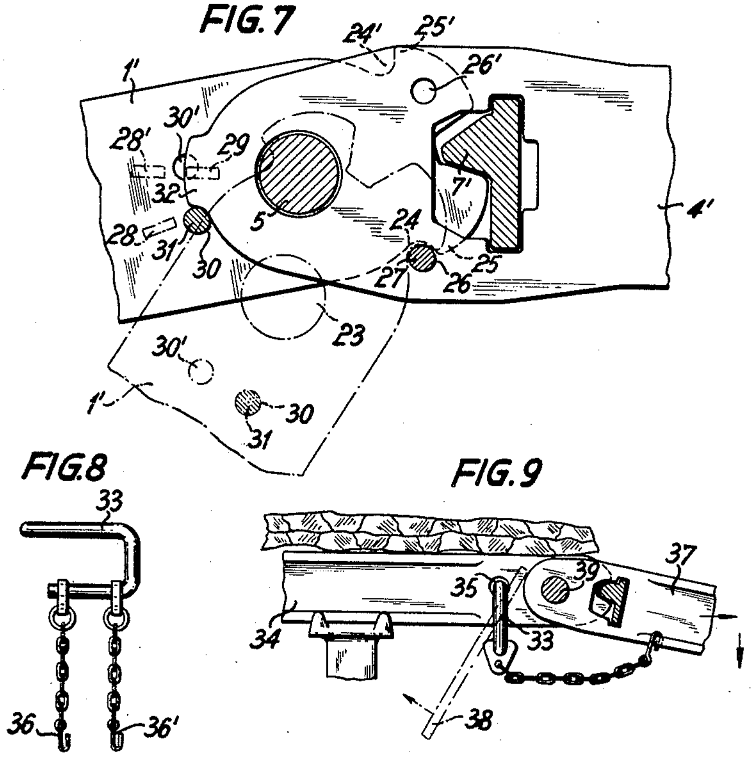
FIGURE 7 shows a lateral, partly sectional view of a modification of FIGURES 1 and 2.
FIGURE 8 shows an elevational view of a safety device for use in the embodiments of FIGURES 1, 2 and 7 when a lagging iron is to be decoupled.
FIGURE 9 shows a side elevational, partly sectional view of two coupled lagging irons with the device of FIGURE 8 in place.

FIGURE 7 illustrates by way of example how with the use of the auxiliary means proposed even in unfavourable spatial conditions, the lagging irons can be brought in a particularly labor-saving manner into the position of juxtaposition of the bolt holes. As indicated by chain-dotted lines, the lagging iron 1' is suspended, firstly with the hook-shaped extension 25 which forms a recess 24 on the lower side of the projection of the tongue, from a low position, in the extreme case from a position extending vertically downward, on the push through pin 27 inserted in a hole 26 arranged in the prongs of the fork of the lagging iron 4'. In the subsequent tilting up of the lagging iron suspended in this manner the recess of the tongue and the locking ridge 7' are forcibly made to rest in one another, and the bolt holes are made to register with one another, in the case illustrated in a position of the lagging iron 1' yet angularly deflected downwardly.

This angular position should preferably correspond to the lowest possible angular position of the advanced lagging iron. After the tilted-up lagging iron has been coupled in by pushing in the pin 5 the position of the lock components as illustrated results in that owing to the out-of-balance weight of the lagging iron 1' which is no longer held by the operator with respect to the tongue the lower locking ridge comes into contact, whereby the push through pin 27 is again released by the hook 25. Then the operator, after having removed the push through pin 27 again, can bring the lagging iron 1' into the advanced position by further tilting the same up and at the same time pushing in the bolt, or merely by driving in the bolt.

In the inverse position of the lagging iron or of both lagging irons, for the use of the push through pin 27 members 24', 25' and 26' are available which are arranged opposite the members 24, 25 and 26 in the same sense, as will be seen.

In order to obviate any unintentionally high tilting up of the lagging iron 1' suspended on the push through pin, as a consequence of which the push through pin may be bent or sheared off as indicated in FIGURE 7 in chain-dotted lines, markers 28, 28' are provided on the tongue, the upper one of which, according to the turned position of the lagging iron, indicates at any time to the operator the position in which the bolt holes register, when they are in juxtaposition with the marker 29 provided on the fork of the lagging iron 4'.

The same figure illustrates also a basic embodiment of a device which not merely indicates the correct coupling position of the lagging iron, but secures the same also upwardly. The same consists as shown in two bores 30 and 30' on the tongue to be used alternately and in a pin 31 to be inserted into the same which limits the possibility of tilting up the lagging iron into the position in which the bolt holes register with one another by the abutting of the projection 32 arranged on the front of the prongs of the fork against the edge which is actually the lower edge, and which like the pin 27 is taken off again after the pushing through of the joint pins has been effected. The two pins 27 and 31 are preferably connected with one another by a chain.

FIGURE 8 shows per se the safety device for preventing any dropping out of the lagging iron to be dismantled.

FIGURE 9 shows the same device in an arrangement mounted on the lagging iron.

As will be seen this device can be fitted by pushing its stirrup-shaped hook 33 into the bore 35 provided on the tongue of the lagging iron 34 in such a way that it is easily detachable by knocking out, and the hooks 36, 36' attached on this stirrup by means of chains can be hooked into the lagging iron to be dismantled, the said hooks being preferably normal. The pushed in stirrup-shaped hook 33 may serve at the same time as an abutment for a lever 38 which can be applied between the components of the lock, by means of which the lagging iron 37 can be forced out if it should not detach itself automatically from the oblique face of the tongue after loosening the pin 39. When the occurrence of such a case is to be expected beforehand, the lever is preferably applied and operated before the loosening of the pin so that the force derived from it can act on the lagging iron 37, which at this moment is still suspended freely, at the moment when the pin releases the lagging iron 37.

The possibility of detaching the two lagging irons in the alternative manner described hereinbefore from their engagement with one another by driving a wedge 44 into an elongated hole 43 in the tongue of one of the irons, is illustrated in FIGURES 1 and 2.

Figure 10:
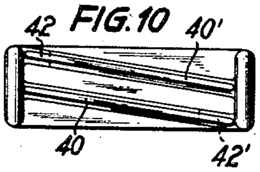
FIGURE 10 shows a top plan view of a modified form of locking element for use in the lagging iron couplings.
Figure 11:
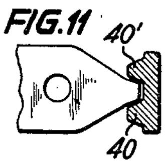
FIGURE 11 shows a side elevational, partly sectional view of the tongue of a lagging iron engaging in the locking element of FIGURE 10.

FIGURES 10 and 11 show on a smaller scale an embodiment of the plate having two parallel locking ridges 40, 40', and the construction of the tongue resulting therefrom. The latter engages, as shown in FIGURE 11, into a groove running obliquely as formed by the ridges while leaving the play according to the invention. This construction of the plate and of the tongue allows a simpler design of the tongue, but does not allow the advantageous application of the auxiliary means shown in the embodiment of the lagging iron connection according to FIGURE 7 for the labour-saving tilting up of the lagging iron to be advanced. Moreover the bolt provided with the double ridge increases the weight of the lagging iron. All the other advantages of the invention are however attainable in almost the same manner with this embodiment.

FIGURE 10 shows also, indicated by 42 and 42' and delineated by chain-dotted lines, the shortening of the ridges 40 and 40', in an arrangement in which each of them lies with one of its ends opposite that of the other and which serves for the purpose of allowing the tongue to emerge from its locking when the bolt is pushed back, so that then the lagging iron to be dismantled on the gobbing side can swing down pendulum-fashion. In this case the outer ranges, limited by the chain-dotted lines, of the ridges 40 and 40' are dispensed with.

Figure 3:
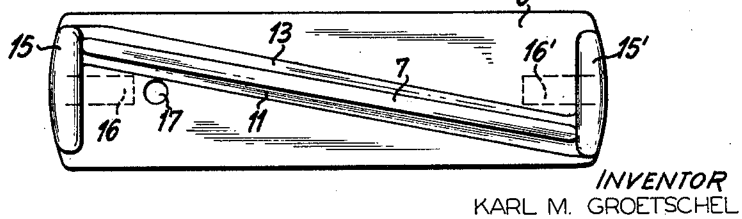
FIGURE 3 shows a first elevation of a part of FIGURES 1 and 2.
Figure 12:
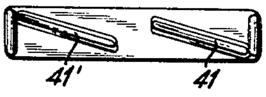
FIGURE 12 shows a top plan view of another form of locking element.

FIGURE 12 shows, likewise on a smaller scale, a plate which can be used at will in exchange with the plate according to the FIGURES 1 to 3, the locking ridge of which is interrupted in the middle range, and the two obliquely running part-ridges 41 and 41' thus formed are arranged offset from one another. The interruption is so dimensioned that a free passage of the tongue of the lock is made possible between the part ridges. According to the turned position of the lagging iron, to which the other one is to be attached, preferably at any time, that ridge is used which lies on the right hand side. This construction allows by entirely disengaging that part-ridge which actually is the lower one, after the propping up of the advanced lagging iron, to make the connection a freely movable joint without limitation, if necessary, so that moreover even tilting down and letting the lagging iron hang on the pivot pin is made possible.

FIGURES 13 to 16 illustrate embodiments of devices which serve for moving the locking element into and out of its operative position in the lock by applying a mechanical pull or push to the same.

Figure 13:
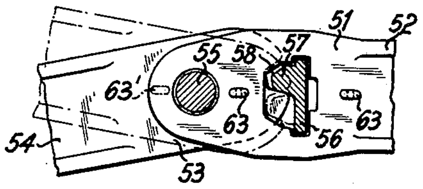
FIGURES 13 to 15 illustrate a device for forcing the locking element into and out of its operative position in the lagging iron couplings of the invention.

FIGURES 13 to 15 show a lagging iron lock of the kind illustrated in principle in the previous figures, consisting of the fork 51, of the lagging iron 52 which is to be assumed as propped up, and of the tongue 53 of the lagging iron 54 to be advanced, as well as the coupling pin 55 and of the fixing plate 56, which co-operates by its oblique ridge 57, with a face of the oblique gap 58 of the tongue 53. In the eyes 63 arranged on the fork 51 the two coiled springs 62 are hooked, one of which is arranged to the right and one to the left of the linkage 60, the said spiral springs being attached on the grip 59 of the said linkage 60 of the pushing-in device which engages with its point the head 61 of the plate 56, the said linkage being adapted to the push-in path of the plate 56.

FIGURE 14 shows the device in the state of loading in readiness for working. In order to push the plate 56 projecting from the fork 51 into the lock, the device is triggered off in that the lagging iron 54 which in position illustrated in FIGURE 13 in full lines clamps the bolt by its tongue to be swung by the fitter up into its position indicated in chain-dotted lines, whereby the path into the lock is cleared for the plate.

FIGURE 15 shows the device in its relaxed condition that is after the released plate has been pushed into the lock right up to the head in accordance with the tilting up operation of the lagging iron 51. According to the circumstances and requirements the operator can naturally terminate the pushing-in operation before reaching the end position of the plate, merely by releasing the lagging iron again.

After terminating the pushing-in operation of the bolt, the relaxed pushing-in device can again be taken off in order to be used for the fitting of the next lagging iron lock. For this purpose the device is hooked to the latter into the eyes 63, after the plate 56 has been pulled out in accordance with FIGURE 14, and the cap to be advanced has been brought into the provisional position illustrated in FIGURE 13 and has been coupled by means of the pivot pin 55. Thereafter the device is tensioned by pulling the grip of the linkage 60, and is brought into its operative position by pushing the point of its linkage into the head of the bolt.

In an appropriately similar manner the same push-in device may be used also for the mechanical insertion of the coupling pin 55 into the lock of the lagging irons, when, as indicated in FIGURE 14 in chain-dotted lines, an eye 63' or the like is provided on the fork. For this however, there is the condition that the lagging iron to be advanced can rest with its tongue on the ridge 75 of the plate 56 and with its other end on the sole at such an angle that while the device is tensioned by the operator, the bolt holes of the fork and of the tongue of the lock do not register with one another, in order that the tongue may lock the pin which is put under load by the device. When the lagging iron is then tilted up about the ridge of the plate as the pivot axis, the tongue clears the entrance for the pin into the lock at that moment in which the lagging iron has reached the position illustrated in in FIGURE 13, in which the bolt holes of the fork and tongue register with one another. Subsequently the push-in device can be transferred to the bolt in order to serve the latter.

Figure 16:
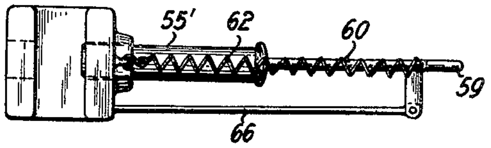
FIGURE 16 shows a side elevational diagrammatic view of a modification of the device of FIGURES 13 to 15.

FIGURE 16 shows an appropriately similar push-in device as the FIGURES 14 and 15, applied to coupling pin 55' of a lagging iron lock illustrated in part, in which the tensioned push-in device is not locked by the tongue of the lagging iron to be advanced, but by means of a brace 66, which can be released by the operator (by means of a rod or chain) who is tilting the lagging iron to be advanced, up at its end for the purpose of releasing the push-in device at the appropriate moment, from a distance.

To simplify the unlocking of the brace 66 a remote controlled device is used, for example a bell crank lever mounted on the lagging iron to be advanced, which in the illustration is not shown, and which when raising the lagging iron to be advanced knocks the brace 66 away from its position shown in FIGURE 16, and thereby releases the spring 12.

In FIGURE 14 moreover an embodiment is shown in chain-dotted lines which differs from the embodiments of the push-in device described. The same consists of a rod- or leaf-spring 73 attached at one end by means of a projecting body 72 on the lagging iron 52, and engaging at the other end of the head of the plate 56 to be pushed in.

As shown, this spring is bent in the non-tensioned condition towards the lagging iron. By bending the spring in the opposite direction the same is tensioned and can then be locked, if desired, by means of a brace similar to the one illustrated in FIGURE 16.

In FIG. 17 the fork of the lock is designated with 51 and the shiftable locking member with 56'. The locking member is in this case not symmetrical. It acts to the counter face of the tongue of the lagging iron 53'' to be forepoled, as clearly represented in FIGURE 17*a*, with the oblique ridge 57'. The locking member 56' is provided with an extension 67 directed downwardly.

Also in the crosswise direction of the lock, there is provided the hydraulical cylinder 68 having a piston 69 which is pivotally connected by a bolt 70 to the end of the extension 67.

It is clear from this description that by actuating the piston the locking member 56' is shifted from the right to the left so to exert the pressure in a spreading sense to the one hand a fix face on the fork 51 of the supported iron and a counter face on the tongue of the lagging iron to be forepoled in a similar manner as shown in FIG. 13 so that the iron to be forepoled can be lifted from an initial position hanging on the connecting bolt 55'' tilting said lagging iron in upward direction into its final position adapted to the roof.

FIG. 18 shows the modification according to which the hydraulic cylinder 68' is arranged in the lengthwise direction of a lagging iron 52' supported by a prop or the like 71, said cylinder being pivotally connected by a bolt 72 with a downwardly directed extension 73 on the lagging iron 52', the piston 69' of said cylinder on the other hand is pivotally connected by a bolt 74 to a wedge 75 which is supported in a rectangular recess formed in another downwardly directed extension 76 at the forward end of the lagging iron 52' in the area of the bolt 55' pivotally connecting said iron with the lagging iron 53' to be forepoled.

Said extension 76 forms two jaws in which rectangular holes 77 are provided into which an intermediate cross member 78 of rectangular cross-section is inserted the lower face of which runs in the direction of the upper face of the wedge member 55. By pushing the wedge member 75 in the direction of the arrow the pressure is transferred by the intermediate of the cross member 78 to the lower face of the lagging iron 53' which is thereby lifted in the same manner as described above into its final position. In FIG. 18 a position of said iron somewhat inclined downwardly is shown, which may be the final position which however may be besides also a horizontal or upwardly inclined position with respect to the lagging iron 52'. Movement of the wedge member 75 in the direction contrary to the arrow in FIG. 18 effects lowering of the lagging iron 53' which is as results from this figure without further explanation hold in its cantilevered position during use only by the wedge member 75 under the intermediate of the cross member 87.

The devices described hereinbefore with reference to FIGURES 13 to 16 can be used also for facilitating the operation of dismantling in basically the same manner, by reversing the direction of the action in an appropriately adapted or modified construction. Its operation can be effected in one case as in the other purely mechanically or in a different manner, for instance by means of compressed air.

The invention is not limited to the embodiment described in detail hereinbefore and illustrated in the drawings, but numerous modifications thereof are possible, without departing from its basic idea.

I claim:

1. In a lagging iron construction including a first beam element to be forepoled;

a second beam element previously supported, said beam elements being pivotally connected together at their end portions;

a movable locking member having a projection providing an inclined camming surface thereon, said locking member being slidably supported by one of said beam elements and the inclined camming surface of said projection engaging an abutting surface on the other of said beam elements whereby movement of said locking member relative to said first beam element and said second beam element causes the inclined camming surface of said projection to cam against the abutting surface on the other of said beam elements to effectively cause the first beam element to be rotated relative to said second beam element and raised into operative position;

and fluid pressure actuated means to effect sliding movement of said locking member relative to said first beam element and said second beam element.

2. The invention defined in claim 1, wherein said movable locking member is arranged transversely of said first and second elements.

3. The invention defined in claim 1, wherein said movable locking member is arranged to move in the lengthwise direction of said first and second beam elements.

4. The invention defined in claim 1, wherein said fluid pressure actuated means comprises a hydraulic cylinder connected to said second beam element, and the piston of said cylinder being pivotally connected to said movable locking member.

References Cited in the file of this patent

UNITED STATES PATENTS

| | | |
|---|---|---|
| 1,469,360 | Cullen | Oct. 2, 1923 |
| 2,696,137 | Thomas et al. | Dec. 7, 1954 |
| 2,749,712 | Gerlach | June 12, 1956 |
| 2,780,067 | Jacobi et al. | Feb. 15, 1957 |
| 2,822,670 | Suderow | Feb. 11, 1958 |
| 2,870,639 | Suderow | Jan. 27, 1959 |
| 2,959,924 | Groetschel | Nov. 15, 1960 |

FOREIGN PATENTS

| | | |
|---|---|---|
| 517,918 | Belgium | Mar. 14, 1953 |
| 775,754 | Great Britain | May 29, 1957 |
| 872,196 | Germany | Mar. 30, 1953 |
| 1,131,220 | France | Oct. 15, 1956 |
| 1,180,955 | France | Jan. 5, 1959 |